(12) United States Patent
Kruspe et al.

(10) Patent No.: US 9,664,011 B2
(45) Date of Patent: May 30, 2017

(54) HIGH-SPEED CAMERA TO MONITOR SURFACE DRILLING DYNAMICS AND PROVIDE OPTICAL DATA LINK FOR RECEIVING DOWNHOLE DATA

(71) Applicants: Thomas Kruspe, Wietzendorf (DE); Rochus Rafael Nowosielski, Hannover (DE)

(72) Inventors: Thomas Kruspe, Wietzendorf (DE); Rochus Rafael Nowosielski, Hannover (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 412 days.

(21) Appl. No.: 14/287,393

(22) Filed: May 27, 2014

(65) Prior Publication Data

US 2015/0345261 A1 Dec. 3, 2015

(51) Int. Cl.
| | |
|---|---|
| *E21B 7/00* | (2006.01) |
| *E21B 41/00* | (2006.01) |
| *H04N 5/225* | (2006.01) |
| *H04N 7/18* | (2006.01) |
| *E21B 47/12* | (2012.01) |
| *E21B 47/16* | (2006.01) |

(52) U.S. Cl.
CPC ............ *E21B 41/0092* (2013.01); *E21B 7/00* (2013.01); *E21B 47/12* (2013.01); *E21B 47/16* (2013.01); *H04N 5/2257* (2013.01); *H04N 7/183* (2013.01); *H04N 2005/2255* (2013.01)

(58) Field of Classification Search
CPC ...................................................... E21B 47/00
See application file for complete search history.

(56) References Cited

U.S. PATENT DOCUMENTS

| | | | |
|---|---|---|---|
| 3,109,693 | A | * 11/1963 | Clements ............ E21B 47/0002 324/356 |
| 4,064,749 | A | 12/1977 | Pittman et al. |
| 4,139,306 | A | 2/1979 | Norton |
| 5,162,935 | A | 11/1992 | Nelson |
| 5,408,325 | A | 4/1995 | Cruickshank |
| 5,485,745 | A | 1/1996 | Rademaker et al. |
| 7,219,729 | B2 | 5/2007 | Bostick et al. |

(Continued)

FOREIGN PATENT DOCUMENTS

| | | | |
|---|---|---|---|
| EP | 0909877 B1 | 7/2004 | |
| WO | 9609561 A1 | 3/1996 | |
| WO | WO2013100743 | * 7/2013 | ............ H04B 10/116 |

OTHER PUBLICATIONS

Banz, et al., "Real-Time Stereo Vision System using Semi-Global Matching Disparity Estimation: Architecture and FPGA-Implementation", IEE Symposium, Feb. 2010, pp. 93-101.

(Continued)

*Primary Examiner* — Shane Bomar
(74) *Attorney, Agent, or Firm* — Cantor Colburn LLP

(57) ABSTRACT

An apparatus for drilling a borehole into the earth includes a drill string configured to drill the borehole and a high-speed camera configured to capture a series of images of the drill tubular at a speed high enough to image information of interest while the drill tubular is in operation. The apparatus further includes a processor configured to receive and process the series of images to provide the information of interest.

23 Claims, 3 Drawing Sheets

(56) References Cited

U.S. PATENT DOCUMENTS

| | | |
|---|---|---|
| 7,316,176 B2 | 1/2008 | Dunn et al. |
| 7,597,142 B2 | 10/2009 | Hartog et al. |
| 7,913,773 B2 | 3/2011 | Li et al. |
| 7,999,695 B2 | 8/2011 | Rodney et al. |
| 8,218,826 B2 | 7/2012 | Ciglenec et al. |
| 8,289,994 B2 | 10/2012 | Abdallah |
| 8,483,445 B2 | 7/2013 | Tjhang et al. |
| 8,548,742 B2 | 10/2013 | Pugh et al. |
| 8,739,354 B2 * | 6/2014 | Buckner .................. E02F 3/384 134/168 C |
| 9,385,808 B2 * | 7/2016 | Lee ....................... H04N 9/3111 |
| 2003/0118230 A1 | 6/2003 | Song et al. |
| 2006/0212224 A1 | 9/2006 | Jogi et al. |
| 2010/0097450 A1 | 4/2010 | Pugh et al. |
| 2010/0295673 A1 | 11/2010 | Ahmad et al. |
| 2011/0139447 A1 | 6/2011 | Ramos et al. |
| 2011/0153217 A1 | 6/2011 | Rodney et al. |
| 2012/0169841 A1 | 7/2012 | Chemali et al. |
| 2015/0075866 A1 * | 3/2015 | Tjhang .................... E21B 44/00 175/45 |
| 2015/0280817 A1 * | 10/2015 | Roberts ................ H04B 10/116 398/118 |
| 2016/0164605 A1 * | 6/2016 | Liu ....................... H04B 10/116 398/118 |

OTHER PUBLICATIONS

Flatt, et al., "A Parallel Hardware Architecture for Connected Component Labeling Based on Fast Label Merging", IEEE International Symposium, May 2008, pp. 144-149.

Olympus, "Oil Well Down Hole Drilling Tool Inspection", Jun. 11, 2011, [retrieved on Dec. 5, 2013, from http://www.olympus-ims.cm/en/applicatons/oil-well-down-hole-drilling-tool-inspection/, 3 pages.

Notification of Transmittal of the International Search Report and the Written Opinion of the International Searching Authority, or the Declaration; PCT/US2015/031112; Mailing Date Aug. 3, 2015, 9 pages.

* cited by examiner

HIGH-SPEED CAMERA TO MONITOR SURFACE DRILLING DYNAMICS AND PROVIDE OPTICAL DATA LINK FOR RECEIVING DOWNHOLE DATA

BACKGROUND

Earth formations may be used for various purposes such as hydrocarbon production, geothermal production, and carbon dioxide sequestration. Boreholes are drilled into the earth using drilling rigs in order to access the formations.

Drilling automation using the drilling rigs requires more and more monitoring of tasks to acquire information about the drilling process. Monitoring the rig floor of a drilling rig and obtaining information about surface dynamics of a drill string is a substantial part of drilling automation. Hence, it would be well received in the drilling industry if apparatus and method could be developed to improve the reliability of obtaining information of interest about the drill string.

BRIEF SUMMARY

Disclosed is an apparatus for drilling a borehole into the earth. The apparatus includes: a drill string configured to drill the borehole; a high-speed camera configured to capture a series of images of the drill tubular at a speed high enough to image information of interest while the drill tubular is in operation; and a processor configured to receive and process the series of images to provide the information of interest.

Also disclosed is a method for drilling a borehole into the earth. The method includes: drilling the borehole using a drill string; capturing a series of images of the drill string using a high-speed camera at a speed high enough to image information of interest while the drill tubular is in operation; and processing the series of images using a processor to provide the information of interest using a processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method for obtaining information of interest concerning a drill string or downhole information while an earth borehole is being drilled. The apparatus and method involve one or more high-speed cameras that are configured to capture a series of images of the drill string while the drill string operates. The series of images is processed to determine differences between the images that relate to dynamics of the drill string. Further, the images may capture optical signals transmitted by an optical signal converter that contain information obtained from a downhole tool or sensor.

Figure 1:
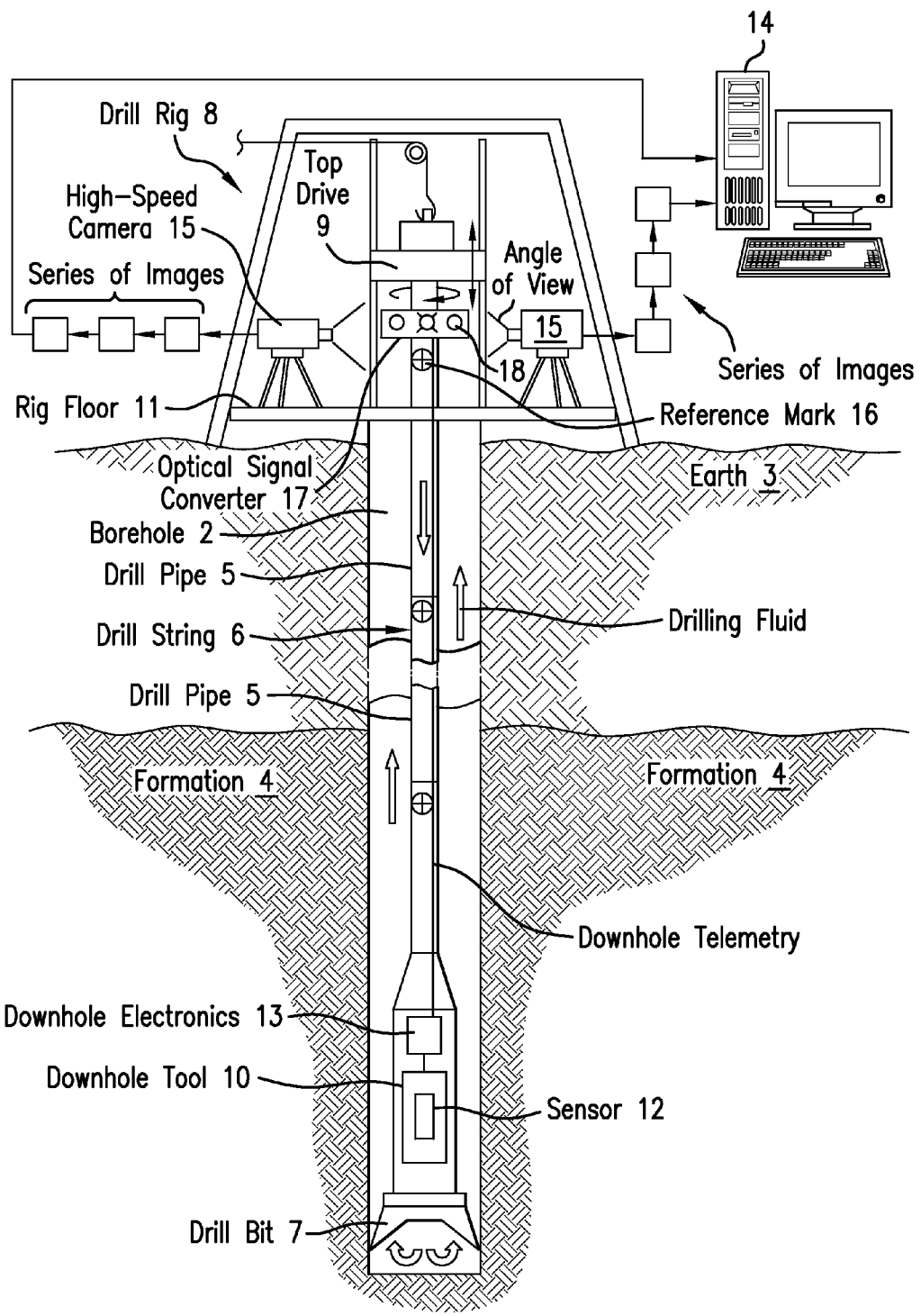
FIG. 1 illustrates a cross-sectional view of an exemplary embodiment of a drill string disposed in a borehole penetrating the earth and a plurality of high-speed cameras configured to image the drill string while in operation.

FIG. 1 illustrates a cross-sectional view of an exemplary embodiment of a drill string 6 disposed in a borehole 2 penetrating the earth 3, which includes an earth formation 4. The drill string 6 includes a series of connected drill pipes 5. The formation 4 represents any subsurface material of interest that may be drilled into to form the borehole 2. The subsurface material can include an earth formation material and/or a material disposed in the borehole 2, any of which may be in the form of a solid, liquid and/or gas. A drill bit 7 is disposed at the distal end of the drill string 6. A drill rig 8 having a rig floor 11 is configured to conduct drilling operations such as rotating the drill string 6 and thus the drill bit 7 in order to drill the borehole 2. In addition, the drill rig 8 is configured to pump drilling fluid through the drill string 6 in order to lubricate the drill bit 7 and flush cuttings from the borehole 2. A top drive 9 is configured to apply torque to the drill string in order to rotate the drill string for drilling purposes.

As illustrated in FIG. 1, a downhole tool 10 includes a sensor 12 that is configured to sense a downhole property such as of the formation 4 or the borehole 2 or to sense an operational characteristic of the drill string 6. Downhole electronics 13 are configured to operate the downhole tool 10, process sensor data, and/or act as an interface with telemetry to communicate data to the surface to receiver such as a computer processing system 14 disposed at the surface of the earth 3. Non-limiting embodiments of the telemetry include pulsed-mud and wired drill pipe.

One or more high-speed cameras 15 are focused on the drill string 6 on or above the rig floor 11. The high-speed cameras 15 are configured to capture a series of digital images of the drill string 6. The series of images is transmitted to the computer processing system 14 for processing. Processing may include executing image recognition software in order to determine changes in consecutive images in the series of images. The image recognition software may be implemented from algorithms in the public domain such those made available by OpenCV (Open Source Computer Vision Library). OpenCV is an open source computer vision and machine learning software library. Alternatively, dedicated hardware implementation may be used or a hybrid combination of dedicated hardware and software. By knowing the time interval between consecutive images and physical displacement of the drill string, which may be rotational displacement, axial displacement, and/or lateral displacement, the computer processing system can calculate the rate or velocity of displacement of the drill string as a function of time or in other words the acceleration or accelerations experienced by the drill string. For example, the velocity of the displacement may equal the amount of the displacement divided by the time interval between consecutive images and the acceleration may equal the change in velocity over two or more consecutive images. In one or more embodiments, the computer processing system can calculate rotational vibration, axial vibration, and/or lateral vibration of the drill string at a region of the drill string imaged by the one or more high-speed cameras. It can be appreciated that the speed of the high-speed camera (i.e., image or frame rate) is selected to be high enough to capture expected displacements or vibrations such that two or more images are captured showing the displacement, velocity or acceleration in one direction before any of these physical properties change direction. In one or more embodiments, the speed is selected to capture at least one image or frame for each revolution of the drill string. It can be appreciated that increasing the speed of the high-speed camera may result in increasing the accuracy of the measurements of the physical movements of the drill string due to decreasing the time between images. High-speed digital cameras having frame rates of 60 frames per second or more are commercially available from well-known manufacturers such as Canon, Sony, JVC®, and Panasonic®.

In order to accurately measure a displacement of the drill string, the drill string may include one or more reference marks 16. One reference mark 16 for example may include a horizontal line and a vertical line where the horizontal line may be used to enhance indication of axial displacement and the vertical line may be used to enhance indication of rotational or lateral displacement. It can be appreciated that two high-speed cameras may be focused on the same region of the drill string but at different non-zero view angles such as 90° (when viewed from above), for example, in order to capture all vector components of lateral vibration. Additionally, stereo vision cameras may be to capture three-dimensional images depicting three-dimensional displacement of the drill string. When more than one reference mark is used, each reference mark may include identification that identifies that specific reference mark. Identification may be used to avoid confusion when two or more separate reference marks are rapidly imaged. Non-limiting examples of identification include letters and/or numbers, bar code, colors or any protocol that can be imaged by a high-speed camera.

One or more of the high-speed cameras 15 may also be used to receive data from the downhole tool 10. Such data may include measurements performed by the sensor 12 and/or data related to operation of the downhole tool 10. To receive downhole data, the one or more high speed cameras 15 provide a series of images of an optical signal converter 17 as illustrated in FIG. 1. The optical signal converter 17 includes a local processor and one of more light sources 18 such as light-emitting diodes (LEDS). The local processor receives a signal from downhole and converts the information in that signal to an illumination code that is implemented by the one or more light sources 18. In one or more embodiments, the code relates to flashing one light source 18 to optically transmit a binary-encoded word where for example the light source being illuminated at a certain time signifies a "1" while that light source not being illuminated at the certain time signifies a "0" or vice-versa. It can be appreciated that use of different light colors and/or light intensities can allow for a higher order of encoding. In one or more embodiments, the optical signal converter 17 includes a series of light sources arranged vertically where the number of light sources in the series equals the number of bits in a byte where the byte may represent one word. Consecutive words may then be flashed at a rate that equals the frame rate of the high-speed camera imaging the light sources in order to transmit the downhole data when the high-speed camera is synchronized to the flashing of the light sources. If the high-speed camera is not synchronized to the light sources, then the frame rate of the camera needs to be twice the data flashing rate. The computer processing system can then identify each word using the image recognition software and output the data in a selected format for further processing, such as recording, by the computer processing system 14 or other processing systems. It can be appreciated that other serial or parallel data communication protocols may be used to transmit the downhole data using illumination of the one or more light sources 18. It can also be appreciated that other types of controllable light-emitting sources may be used to communicate the signal such a laser, an incandescent bulb, a light source with a shutter, or some combination thereof. The light sources may be configured to emit visible light, infrared light, ultraviolet light, or some combination thereof.

The data encoding for the visual communication link may be binary or higher order: the rotating light emitters are intended to turn on and off or change color or intensity, at a defined rate. The high-speed camera captures video sequences at a defined frame rate. By a video processing algorithm, the state of the light emitter is determined. An exemplary communication protocol is a sequence of eight data bits per byte. In order to increase reliability, further fault detection or correction codes like Hamming Codes can be used. A different possibility is cyclic redundancy checking codes following data packets of several bytes.

For detection of the light emitter state, in each video frame the light emitters are detected by a video processing algorithm: threshold based binary picture (light regions become white, dark regions become black), labeling (each pixel is labeled, adjacent pixels of one color get the same label), shape recognition (a light emitter has to have a defined size and diameter, this can be expressed by the weight of the detected shape area).

The detection of the drill pipe vibration can be done by stereo video capture and using algorithms to process the captured video. The drill pipe is detected as a foreground object computed from the disparity in the left and right frame. The left most and right most position of the drill string compared to the positions from former frames. The motion velocity of the edge from one frame to the next can be computed from the distance and frame rate of the camera system. In that way, the frequency of vibration can be determined over time.

In one or more embodiments, at least one of the high-speed cameras 15 may be coupled to the top drive 9 in order to continuously image or track (via automatic movement configuration) the optical signal converter 17 as it moves downward toward the surface of the earth as the borehole 2 is being drilled. Alternatively, at least one of the high-speed cameras 15 may be coupled to a tracking motor (not shown) that is configured to move the aim of the high-speed camera 15 (via automatic movement configuration) to track the optical signal converter 17 as it moves while the borehole is being drilled. Alternatively, the field of view of each of the high-speed cameras (as determined by the camera lens) or combination of high-speed cameras may be such that the drill string and optical signal converter are imaged at the same time such as illustrated in FIG. 1. It can be appreciated that in embodiments where a series of images has a wide view, which encompasses more than a region of interest, software can be used to just focus in on or expand the region of interest in each of the images following movement of the region of interest from image to image.

Figure 2:
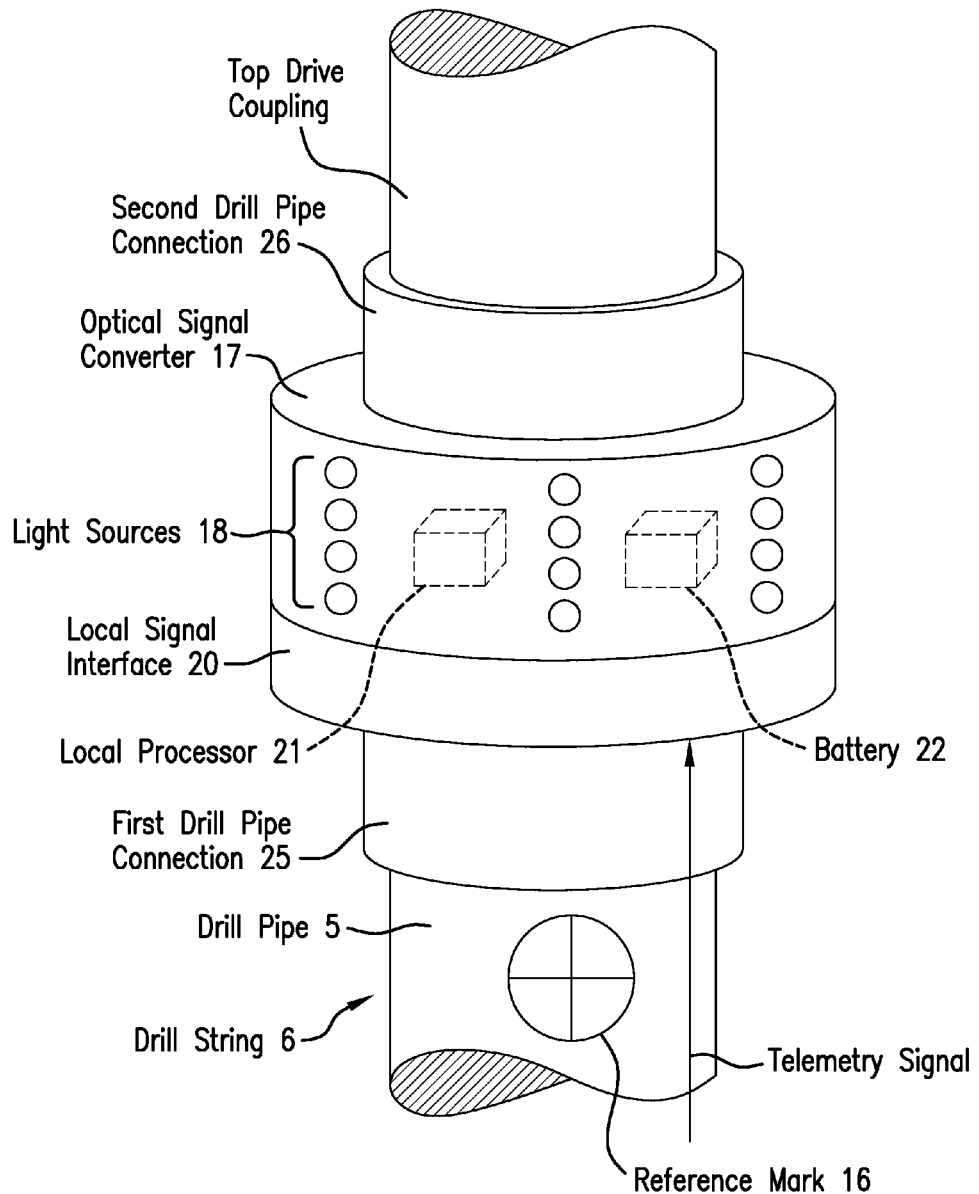
FIG. 2 depicts aspects of an optical signal converter configured to be connected to the drill string at the surface of the earth and to convey signal information from a downhole tool or sensor.

FIG. 2 depicts aspects of the optical signal converter 17 in a three-dimensional view. In the embodiment of FIG. 2, a plurality of the light sources 18 are arranged in vertical columns where the number of light sources 18 in a column equals the number of bits in digital words to be imaged by the one or more high-speed cameras 15. The optical single converter 17 in FIG. 2 includes a local downhole signal interface 20, a local processor 21 and battery 22, which may be rechargeable. In lieu of or in addition to the battery 22, the optical signal converter 17 may include other types of energy sources such as an energy harvester that is configured to convert repetitive motion into electrical energy. The local downhole signal interface 20 is configured to receive the downhole signal and convert that signal to a signal that is provided to the local processor 21. In one or more embodiments, the local downhole signal interface 20 includes an inductive coupling (not shown) for receiving the downhole signal when that signal is conveyed by wired drill pipe. Alternatively, in another embodiment the local downhole signal interface 20 includes a mechanical-electrical transducer (not shown) that converts pressure pulses in drilling fluid (i.e., mud pulse telemetry) to an electrical signal for processing by the local processor 21. It can be appreciated that the local downhole signal interface 20 may also be configured to convert optical signals conveyed by optical fiber, acoustic signals, radio signals, or other types of signals into signals appropriate for processing by the local processor 21. The local processor 21 is configured to encode the downhole signal and operate the plurality of light sources 18 in accordance with the encoding for imaging of the encoded light signals by the one or more high-speed cameras 15. The battery 22 is configured to power the local downhole signal interface 20, the local processor 21 and the plurality of light sources 18. It can be appreciated that in another embodiment the optical signal converter having the above discussed components may be configured to clamp or attach to the outside of a drill pipe as in a sleeve configuration without being connected to a drill pipe end connection.

Still referring to FIG. 2, the optical signal converter 17 includes a first drill pipe connection 25 for connecting to a lower drill pipe and a second drill pipe connection 26 for coupling directly or indirectly to the top drive 9. The first drill pipe connection 25 and the second drill pipe connection 26 are the same or similar to the two known drill pipe connections (e.g., pin-end and box-end threaded connections) that a drill pipe has. Hence, the optical signal converter 17 can be connected directly to a lower drill pipe and other pipe or interface that is driven by the top drive 9.

Figure 3:
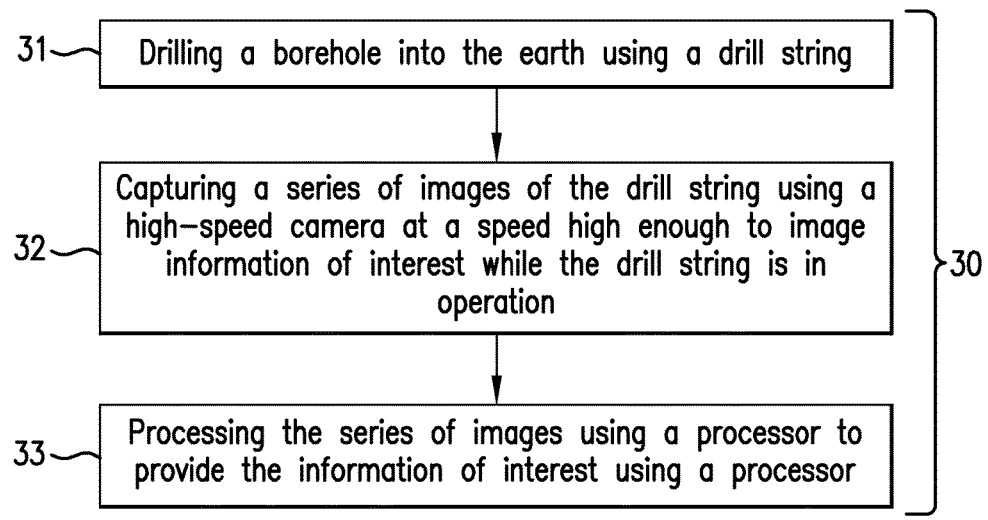
FIG. 3 is a flow chart for a method for drilling a borehole into the earth.

FIG. 3 is a flow chart for a method 30 for drilling a borehole into the earth. Block 31 calls for drilling the borehole using a drill string. Block 32 calls for capturing a series of images of the drill string using a high-speed camera at a speed high enough to image information of interest while the drill string is in operation. Block 33 calls for processing the series of images using a processor to provide the information of interest. Processing may include recognizing a difference between consecutive images in the series of images and quantifying the difference in order to provide the information of interest. In one or more embodiments, drill string displacements can be measured over a series of consecutive images in order to calculate acceleration of the drill string and, thus, the absolute vibration levels experienced by the drill string. The calculated absolute vibration levels may be recorded and/or displayed to a user. The method 30 may also include providing an indication to a user if the information of interest exceeds a threshold level and/or providing a control signal automatically to a drill string motivator (i.e., a device for applying energy to the drill string) if the information of interest exceeds a threshold level with the control signal being intended to bring the information of interest to an acceptable level. In this manner, vibrations may be controlled if they exceed a vibration threshold level. The method 30 may also include decoding an optical signal imaged in the series of images to provide the information of interest, the optical signal including downhole sensor data or downhole tool data.

The apparatus and method disclosed herein provide several advantages. One advantage relates to being able to measure physical dynamics of a drill string at the surface of the earth without having to interface physically with the drill string or with components operating the drill string. This can provide for more reliable sensing of surface dynamics. Regarding obtaining a downhole signal at the surface, conventional apparatus for obtaining the downhole signal when wired drill pipe is used typically uses a physical interface such as a slip-ring configuration, which can be subject to wear due to friction and interference due to sparking. Use of the high-speed camera and optical signal interface provides a non-physical interface that can avoid those pitfalls and increase reliability and signal clarity.

In support of the teachings herein, various analysis components may be used, including a digital and/or an analog system. For example, the downhole electronics 13, the computer processing system 14, the optical signal converter 17 or the high-speed cameras 15 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. The term "processor" relates to a device that processes data, such as digital images, to provide processed data of interest for accomplishing a desired task. Non-limiting examples of the processor include a general purpose processor, a microcontroller, a digital signal processor, and an application-specific instruction-set processor (ASIP). The processor may be implemented using dedicated hardware such an application-specific integrated circuit (ASIC) or by configurable or reconfigurable hardware such as a programmable logic device (PLD) or a field-programmable gate array (FPGA). In one or more embodiments, the processor may be implemented by an integrated circuit. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" do not denote a particular order, but are used to distinguish different elements. The term "couple" relates to a component being coupled to another component either directly or indirectly using an intermediate component. The term "configured" relates to a structural limitation of an apparatus that allows the apparatus to perform the task or function for which the apparatus is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for drilling a borehole into the earth, the apparatus comprising:
    a drill string comprising a drill tubular and configured to drill the borehole;
    one or more controllable light sources disposed on the drill tubular and configured to display an optical signal conveying information received from a downhole tool;
    a high-speed camera disposed at the surface of the earth and configured to capture a series of images of the one or more controllable light sources at a speed high enough to image the optical signal while the drill tubular is in operation; and
    a processor configured to receive and process the series of images to provide the information received from the downhole tool.

2. The apparatus according to claim 1, wherein the drill tubular is a drill string and the speed of the high-speed camera is high enough to capture at least one image of the drill string for each revolution of the drill tubular.

3. The apparatus according to claim 1, wherein the high-speed camera is further configured to image the drill tubular and the processor is configured to execute image recognition software and to determine a change from one image to an immediately following next image in the series of images.

4. The apparatus according to claim 3, wherein the drill tubular comprises a reference mark that can be recognized by the image recognition software.

5. The apparatus according to claim 4, wherein the processor is configured to relate a change in position of the reference mark and the speed of the high-speed camera to an axial vibration value.

6. The apparatus according to claim 4, wherein the processor is configured to relate a change in position of the reference mark and the speed of the high-speed camera to a lateral vibration value.

7. The apparatus according to claim 3, wherein the processor is configured to compare each image in the series of images to a reference image and to provide an indication if one or more images differs from the reference image by more than a threshold value.

8. The apparatus according to claim 1, further comprising an optical signal converter mechanically connected to the drill string so as to rotate with rotation of the drill string and configured to convert a downhole signal to the optical signal that is imaged by the high-speed camera.

9. The apparatus according to claim 8, wherein the optical signal converter comprises the one or more controllable light sources configured to emit light to provide the optical signal.

10. The apparatus according to claim 9, wherein the optical signal converter is configured to pulse the one or more controllable light sources according to a signal code.

11. The apparatus according to claim 9, wherein the optical signal converter is configured to illuminate the one or more controllable light sources in a plurality of colors according to a signal code.

12. The apparatus according to claim 9, wherein the one or more controllable light sources comprises a light-emitting diode (LED), a laser, an incandescent bulb, a shutter or some combination thereof.

13. The apparatus according to claim 9, wherein the light source is configured to emit visible light, infrared light, ultraviolet light, or some combination thereof.

14. The apparatus according to claim 8, wherein the optical signal converter comprises a battery.

15. The apparatus according to claim 8, wherein the downhole signal is received from a downhole sensor.

16. The apparatus according to claim 1, wherein the high-speed camera comprises a plurality of high-speed cameras, each high-speed camera in the plurality being aimed at the drill tubular at an angle that differs from the angle of the other high-speed cameras.

17. A method for drilling a borehole into the earth, the method comprising:
    drilling the borehole using a drill string comprising a drill tubular;
    displaying an optical signal conveying information received from a downhole tool using one or more controllable light sources disposed on the drill tubular;
    capturing a series of images of the one or more controllable light sources using a high-speed camera disposed at the surface of the earth and at a speed high enough to image the optical signal while the drill tubular is in operation; and
    processing the series of images using a processor to provide the information received from the downhole tool using a processor.

18. The method according to claim 17, further comprising capturing a series of images of the drill tubular using the high-speed camera at a speed high enough to image information of interest and providing an indication to a user if the information of interest exceeds a threshold level.

19. The method according to claim 17, further comprising providing a control signal automatically to a drill string motivator if the information of interest exceeds a threshold level.

20. The method according to claim 17, wherein processing comprises recognizing a difference between consecutive images in the series of images.

21. The method according to claim 20, wherein processing further comprises quantifying the difference in order to provide the information of interest.

22. The method according to claim 17, wherein processing further comprises decoding the optical signal imaged in the series of images to provide the information received from the downhole tool, the optical signal comprising downhole sensor data or downhole tool data.

23. The apparatus according to claim 1, wherein the one or more controllable light sources are configured to rotate with rotation of the drill string.

* * * * *